May 12, 1959
H. H. PELZER ET AL
2,885,701
MOTOR-OPERATED MEAT BLOCK SCRAPER
Filed Jan. 24, 1956
4 Sheets-Sheet 1
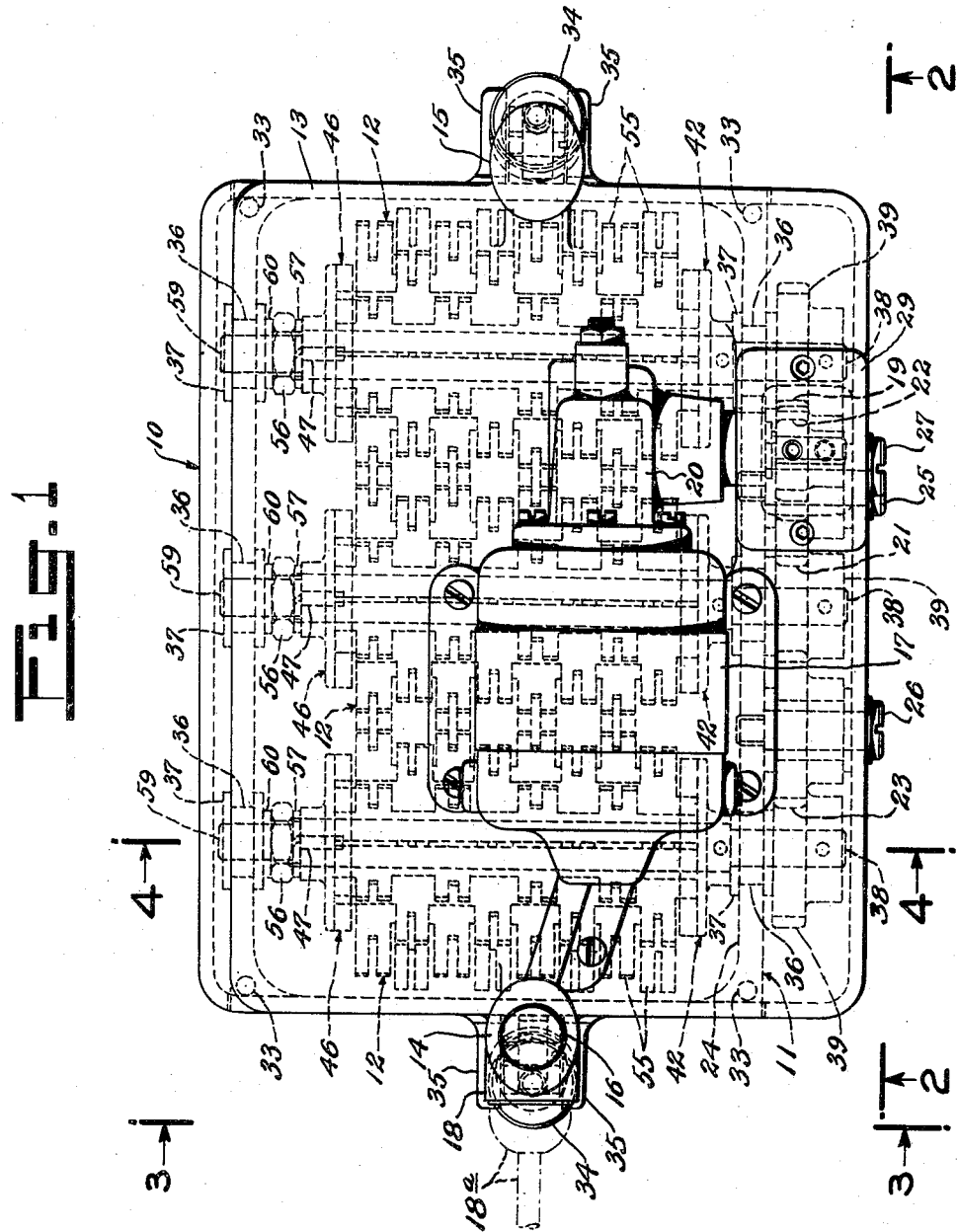
INVENTORS
HAROLD H. PELZER
BY SIDNEY G. THOMPSON
H. G. Manning
ATTORNEY May 12, 1959
H. H. PELZER ET AL
2,885,701
MOTOR-OPERATED MEAT BLOCK SCRAPER
Filed Jan. 24, 1956
4 Sheets-Sheet 2
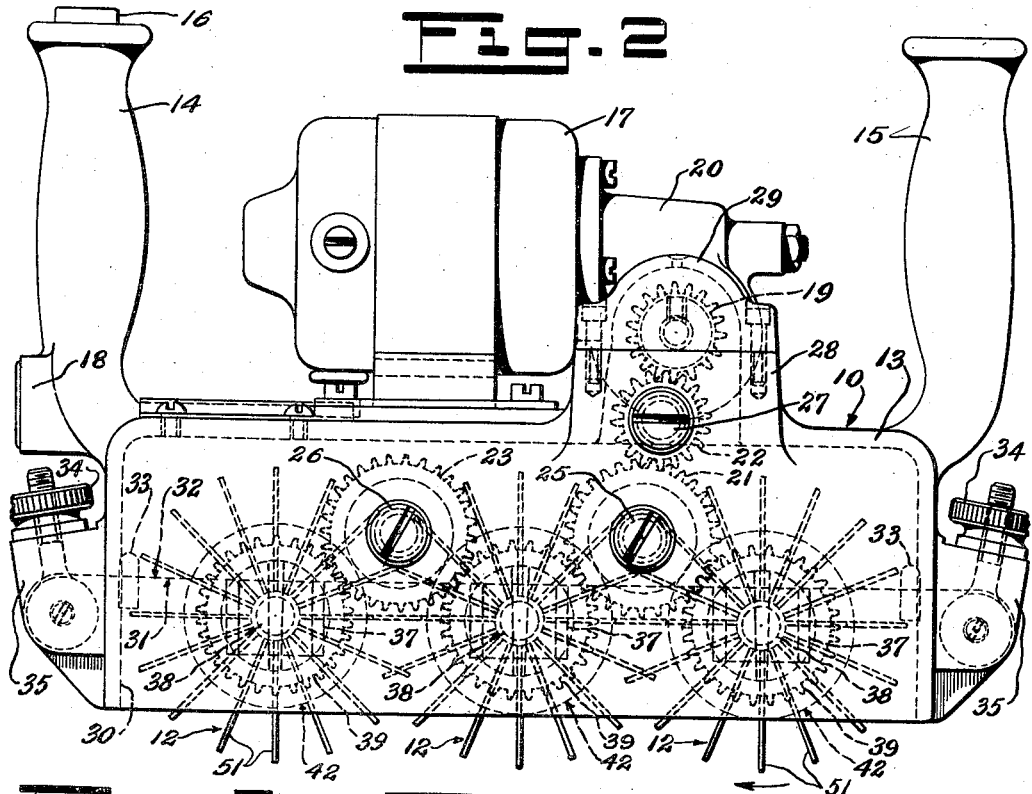
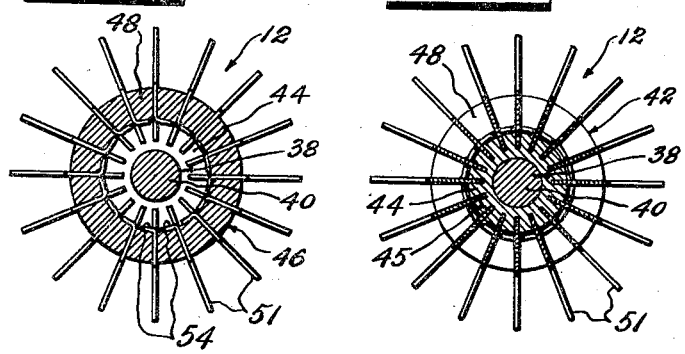
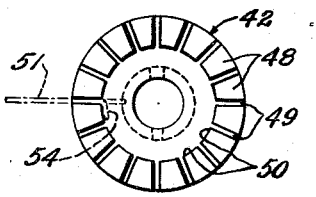
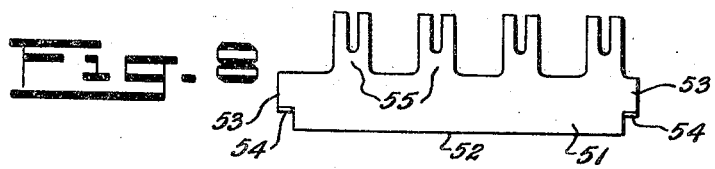
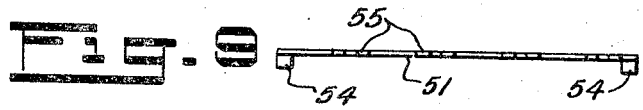
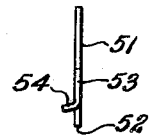
INVENTORS
HAROLD H. PELZER
BY SIDNEY G. THOMPSON
H. G. Manning
ATTORNEY May 12, 1959

H. H. PELZER ET AL 2,885,701

MOTOR-OPERATED MEAT BLOCK SCRAPER

Filed Jan. 24, 1956

INVENTORS
HAROLD H. PELZER
SIDNEY G. THOMPSON
BY
H. G. Manning
ATTORNEY

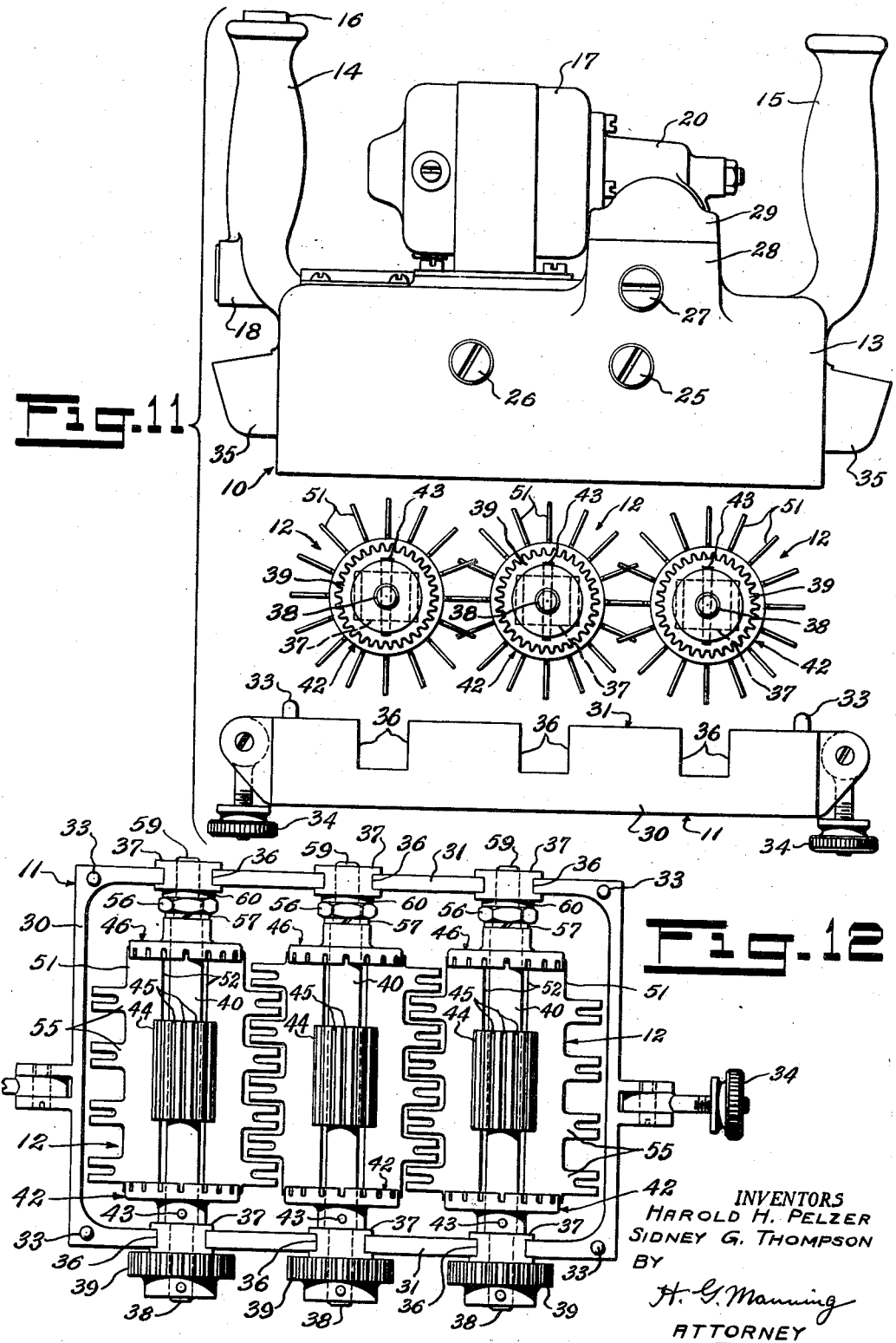

United States Patent Office 2,885,701
Patented May 12, 1959

2,885,701

MOTOR-OPERATED MEAT BLOCK SCRAPER

Harold H. Pelzer, Long Island City, N.Y., and Sidney G. Thompson, Waterbury, Conn.; said Pelzer assignor to said Thompson Application January 24, 1956, Serial No. 560,972

1 Claim. (Cl. 15—93)

This invention relates to power operated hand tools and more particularly to a motor operated meat block scraper.

One object of this invention is to provide a power operated hand tool having a plurality of rotating scraper blades for cleaning the surface of a meat block.

Another object is to provide a device of this nature in which the individual scraper blades may be quickly and easily replaced when they become worn.

A further object is to provide a device of this nature wherein the working parts may be quickly and easily removed for cleaning.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawings one form in which the invention may conveniently be embodied in practice.

In the drawings,

Fig. 1 represents a plan view of one form of motor operated meat block scraper embodying the present invention.

Fig. 2 is a rear elevation of the same.

Fig. 5 is a cross section taken on the line 5—5 of Fig. 4.

Fig. 6 is a cross section taken on the line 6—6 of Fig. 4.

Fig. 7 is a front view of one of the end plates for holding the scraping blades in position.

Fig. 8 is a front elevation of one of the scraping blades.

Fig. 9 is a top view of one of the scraping blades.

Fig. 10 is an end view of one of the scraping blades.

Fig. 11 is an exploded view showing the device disassembled for cleaning.

Fig. 12 is a plan view of the scraper rotor mounting frame, with the uppermost scraper blades removed to show how the blades on adjacent rotors intermesh.

Figure 3:
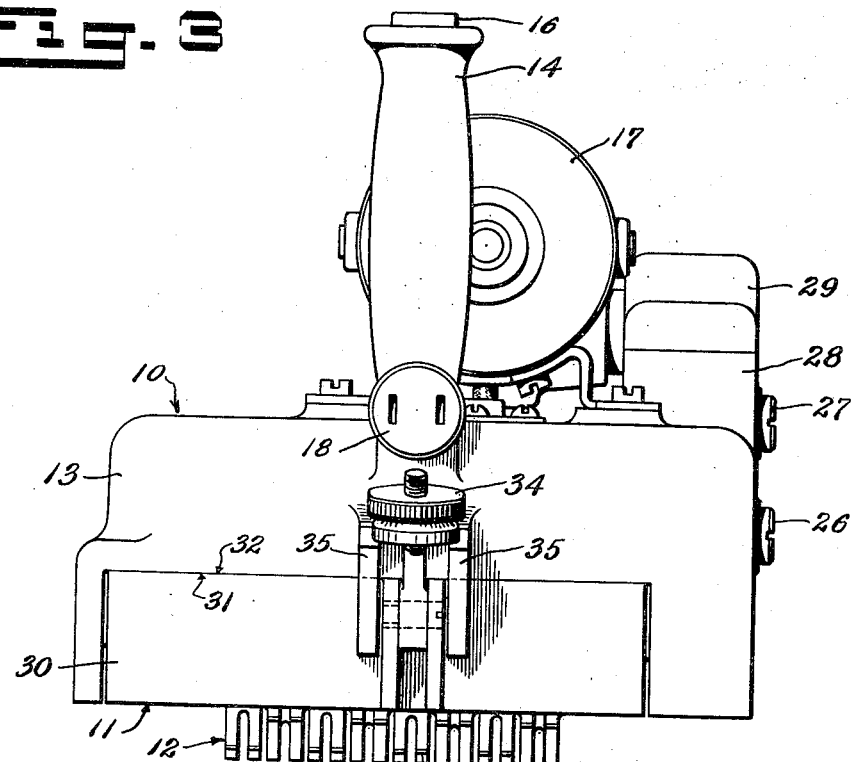
Fig. 3 is a side elevation as viewed from the left in Fig. 2.

Referring now to the drawings in which like reference numerals denote corresponding parts throughout the several views, the numeral 10 indicates the main body portion of the scraper generally, having a removable rotor retaining frame, indicated generally at 11, for operatively supporting a plurality of scraping rotors, indicated generally by the numeral 12. The main body 10 of the scraper comprises a downwardly extending hood 13 provided at each end with a pair of upwardly extending handles 14 and 15, one of which may be provided with a push button 16 for controlling the operation of the electric motor 17 mounted on top of the hood 13 and supplied by electric current from a connector 18, by means of suitable wiring (not shown).

The motor 17 drives a spur gear 19 through a reduction gear 20. The spur gear 19 in turn drives the main driving gear 21 through an idler gear 22. An idler driving gear 23 is also provided for a purpose which will be explained later. The gears 21 and 23 are protected from contact with debris flying up from the scraping rotors 12 by means of an interior lengthwise extending partition 24 which also supports one end of each of the removable bearing pins 25 and 26. The other ends of these bushings are supported by suitable openings provided in the exterior of the hood 13. The gear 22 is similarly mounted on a removable bearing pin 27 in an enclosed housing 28 having a removable cap 29 containing a suitable bearing for the spur gear 19. The rotor retaining frame 11 includes a shallow rectangular member 30 having its upper edge 31 finished flat to abut against the downwardly extending shoulder 32 formed within the hood 13 and extending along the partition 24. A plurality of locating pins 33 may also be provided to accurately position the rotor retaining frame 11 and a pair of swiveled thumb nuts 34 are also provided for detachable engagement with the ears 35 at each end of the hood 13.

The member 30 is also provided with a plurality of bearing guide slots 36 extending downwardly from the top edge 31 along each side, the slots of one side being placed in alignment with the slots in the other side so as to removably receive the bearing blocks 37 with the upper surfaces of the bearing blocks being finished flat to form a continuation of the top surface 31 of the member 30 when in place. Each of the scraping rotors 12 includes a shaft 38; one end of the shaft being provided with a gear 39 which is rigidly connected to the shaft 38. The central portion 40 of the shaft 38 (see Fig. 4) is enlarged to form an annular shoulder 41 at one end, between which shoulder and the face of gear 39, one of the bearing blocks 37 is located to allow for free rotation of said shaft. A disk-shaped blade holder 42 is positioned on the central portion 40 adjacent the shoulder 41 and is secured to the shaft 38 by means of a tapered pin 43. A blade guide 44 having a plurality of circumferentially spaced longitudinal blade receiving grooves 45 is force fitted on the central portion 40, said guide being provided to prevent the scraped blades from bending longitudinally when in use.

Another blade holder 46 is removably received on the other end of the central portion 40 but is prevented from relative rotation therewith by means such as the key 47. (See Figs. 1 and 4.) The inner face of each of the blade holders 42 and 46 is provided with a plurality of circumferentially arranged segmental portions 48 (see Fig. 7) to provide a series of radially extending blade receiving slots 49, the inwardly directed circumferential faces or shoulders 50 of the segmental portions 48 comprising a series of shoulders. Each of the scraper blades 51 is formed preferably from a flat strip of spring steel and is provided with a straight bottom edge 52 to be received in one of the grooves 45 in the blade guide 44.

The lower corners of the blade 51 are cut and bent angularly to form lugs 54 which will extend under the shoulders 50 to prevent the blades from flying out during rotation of the rotors 12, while the laterally extending ends 53 are received in the slots 49 of the blade holders 42 and 46.

The blades are also provided with a plurality of outwardly projecting longitudinally spaced split scraping fingers 55. It should be noted that the space between each of the scraping fingers 55 is slightly greater than the width of one of the scraping fingers and they are so arranged that while one of the scraping fingers is positioned at one end of the blade 51 a space is provided at the other end of the blade, whereby when the blades on the intermediate rotor are reversed end for end so that the scraping fingers of the blades on this rotor will revolve between the scraping teeth on the two outer rotors as shown in Fig.

12. The blade holder 46 together with the assembled blades 51 are secured in position by means of a jam nut 56 and a lock washer 57 tightened down against the shoulder 58 (see Fig. 4) which is formed by the end of the central portion 40 of the shaft 38. The projecting end 59 of the shaft 38 will be rotatably received in one of the removable bearing blocks 37.

*Operation*

In operation, when current is supplied to the connector 18 from the electrically connected plug and lead wire 18a, Fig. 1, the motor 17 will turn the scraper rotors 12 at a uniform rate of speed so that when the apparatus is held by means of the handles 14 and 15 the scraper fingers 55 may be brought in contact with the surface of a meat block. Due to the width of the scraper blades 51, and the fact that several blades are operating at the same time, the surface of a meat block (not shown) will not be worn down unevenly, as is the case with conventional hand scrapers or wire brushes which act only on a small portion of the surface at one time.

When the scraper is being operated the rotors 12 will revolve in a clockwise direction as viewed in Fig. 2, and the machine as a whole will be moved manually from right to left over the surface of the meat block, against the rotation of the scraper blades. After each such traversal, the machine will be lifted and returned to the right hand side of the block, with the scraper blades out of contact with the block surface, and the aforementioned operation will be repeated until the entire surface has been cleaned and scraped.

Figure 4:
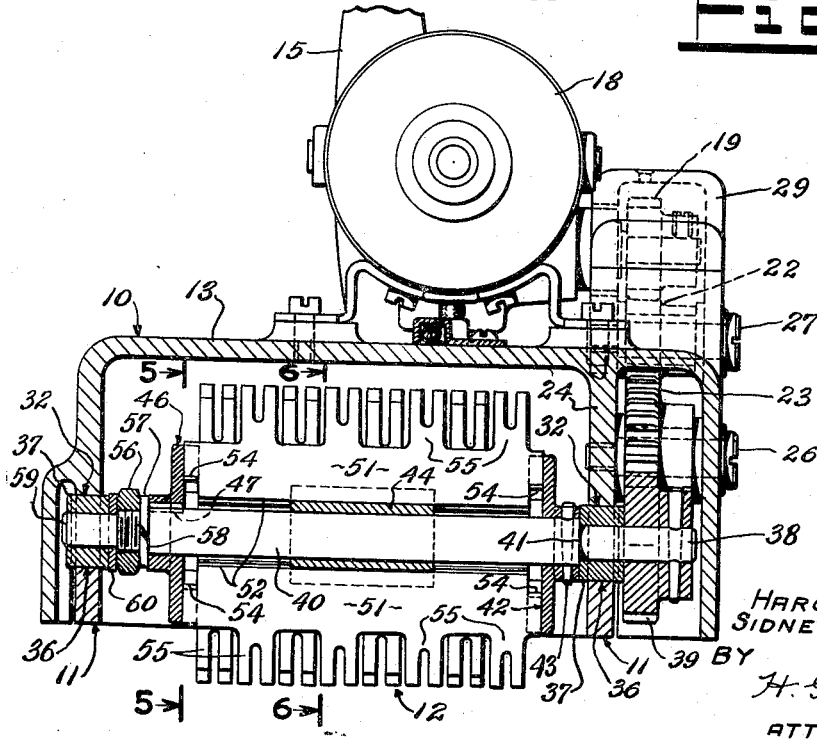
Fig. 4 is a cross-sectional elevation taken on the line 4—4 of Fig. 1.

When it is desired to clean the scraper or to change the blades, the rotor retaining frame 11 can be removed by unscrewing the thumb nuts 34. With the frame 11 thus removed, each of the scraping rotors 12 can be removed by lifting the bearing blocks 37 out of their slots 36 as illustrated in Fig. 11. Each of the blades 51, referring to Fig. 4, can then be removed by slipping off the bearing block 37 and thrust washer 60 from the end 59 of the shaft 38 and unscrewing the jam nut 56. This will allow removing the lock washer 57 and the blade holder 46, the blade holder 42 and guide 44 remaining in place on the shaft 38. The blades 51 are then slipped out of the holder 48 and guide 44. The blades 51 may be replaced by reversing the process, using care to see that the blades are replaced so that the scraping fingers 55 will clear each other as described in connection with Fig. 12. The blades 51 when replaced will be held in their proper alignment when the holder 46 is in proper axial alignment with the key 47 and the lock washer 57 and jam nut 56 are in the position as illustrated in Fig. 4. The length of the enlarged portion 40 of the shaft 38 is such that when the jam nut 56 is securely screwed up into position, the pressure exerted upon the blade holder plate 46 will not cause the scraping blades 51 to bend or buckle at their central portions which are held by the grooves 45 of the blade guide 44.

While there has been disclosed in this specification one form in which the invention may be embodied, it is to be understood that this form is shown for the purpose of illustration only, and that the invention is not limited to this specific disclosure, but may be modified and embodied in various other equivalent forms without departing from its spirit. In short, the invention includes all the modifications and embodiments coming within the scope of the following claim:

Having thus fully described the invention what is claimed as new and for which it is desired to secure Letters Patent is:

In a meat block scraper, the combination including a body portion having a motor attached thereto, a plurality of rotatable generally cylindrical scraper means provided with scraper blades having axially spaced teeth mounted on said body portion, and drive means operably connecting said motor and said scraper means, said blades being rotatable about parallel horizontal axes, the blades rotatable about one of said axes having teeth axially offset with respect to the teeth of the blades rotatable about an adjacent axis, whereby said axes may be spaced closely together, with the teeth of one scraper means revolving through the spaces between teeth of the adjacent scraper means.

References Cited in the file of this patent

UNITED STATES PATENTS

| | | |
|---|---|---|
| 2,200,921 | Granell | May 14, 1940 |
| 2,523,319 | Middlestadt | Sept. 26, 1950 |
| 2,534,101 | Bongiorni | Dec. 12, 1950 |
| 2,706,301 | Gango | Apr. 19, 1955 |
| 2,706,304 | Demory | Apr. 19, 1955 |
| 2,753,576 | Libecap | July 10, 1956 |